(12) United States Patent
Akahane

(10) Patent No.: US 8,705,540 B2
(45) Date of Patent: Apr. 22, 2014

(54) NETWORK RELAY APPARATUS

(75) Inventor: Shinichi Akahane, Hachioji (JP)

(73) Assignee: Alaxala Networks Corporation, Kanagawa (JP)

( * ) Notice: Subject to any disclaimer, the term of this patent is extended or adjusted under 35 U.S.C. 154(b) by 1211 days.

(21) Appl. No.: 12/582,901

(22) Filed: Oct. 21, 2009

(65) Prior Publication Data

US 2010/0103933 A1 Apr. 29, 2010

(30) Foreign Application Priority Data

Oct. 28, 2008 (JP) ................... 2008-276586

(51) Int. Cl.
*H04L 12/28* (2006.01)
*H04L 12/56* (2011.01)

(52) U.S. Cl.
USPC ........... 370/396; 370/351; 370/352; 370/353; 370/392; 370/398

(58) Field of Classification Search
None
See application file for complete search history.

(56) References Cited

U.S. PATENT DOCUMENTS

| | | | |
|---|---|---|---|
| 7,263,091 B1 * | 8/2007 | Woo et al. ..................... | 370/351 |
| 7,289,503 B1 | 10/2007 | Sindhu et al. | |
| 7,518,986 B1 * | 4/2009 | Chadalavada et al. ........ | 370/218 |
| 2003/0072271 A1 * | 4/2003 | Simmons et al. ............. | 370/255 |
| 2008/0044181 A1 * | 2/2008 | Sindhu ........................... | 398/49 |

* cited by examiner

*Primary Examiner* — Jae Y Lee
(74) *Attorney, Agent, or Firm* — Mattingly & Malur, PC

(57) ABSTRACT

The network relay apparatus includes: a plurality of distributed processing units configured to receive and send a packet from and to an external device; an integrated processing unit connected with the plurality of distributed processing units; and a mode selector configured to change over a processing mode of the network relay apparatus between a distributed processing mode and an integrated processing mode, based on at least either one of a load applied to the network relay apparatus and a packet type determined according to header information of the received packet.

10 Claims, 17 Drawing Sheets

PACKET TRANSFER PATHWAY IN INTEGRATED PROCESSING MODE

PACKET TRANSFER PATHWAY IN DISTRIBUTED PROCESSING MODE

Fig.6

| FTY | L2HD — LAYER 2 HEADER INFORMATION | | L2OT L2UM | L3HD — LAYER 3 HEADER INFORMATION | | L3OT | L3UM L4HD | | DD |
|---|---|---|---|---|---|---|---|---|---|
| | | | | CONDITIONS | | | | | |
| FLOW TYPE | VLAN ID | UPRI ADDITIONAL INFORMATION | LAYER 2 Unicast/ Multicast | TOS | ADDITIONAL INFORMATION | LAYER 3 Unicast/ Multicast | LAYER 4 HEADER INFORMATION | | PROCESSING MODE |
| f1 | * | * * | * | * | * | * | * | | INTEGRATED PROCESSING |

| FTY | L2HD | | L2OT L2UM | | L3HD | | L3OT | L3UM L4HD | | DD |
|---|---|---|---|---|---|---|---|---|---|---|
| | LAYER 2 HEADER INFORMATION | | | | LAYER 3 HEADER INFORMATION | | | | | |
| | | | ADDITIONAL INFORMATION | LAYER 2 Unicast/ Multicast | TOS | ADDITIONAL INFORMATION | | LAYER 3 Unicast/ Multicast | LAYER 4 HEADER INFORMATION | |
| FLOW TYPE | VLAN ID | UPRI | | | | | | | | PROCESSING MODE |
| f1 | VID1 | * | * | * | * | * | | * | * | INTEGRATED PROCESSING |
| f2 | VID2 | * | * | * | * | * | | * | * | DISTRIBUTED PROCESSING |

| FLOW TYPE :FTY | STATISTICAL INFORMATION :SI | | | | | UPPER THRESHOLD OF AVERAGE NUMBER OF PACKETS: UB | LOWER THRESHOLD OF AVERAGE NUMBER OF PACKETS: LB |
|---|---|---|---|---|---|---|---|
| | NUMBER OF ACCUMULATED PACKETS :SPC | NUMBER OF ACCUMULATED BYTES :SBC | PREVIOUS ARRIVAL TIME :SLT | AVERAGE NUMBER OF PACKETS :SPPS | AVERAGE NUMBER OF BYTES :SBPS | | |
| f1 | 100 | 1000[BYTES] | 10[SECONDS] | 100 [PACKETS /SECOND] | 10000 [BYTES /SECOND] | 200 [PACKETS /SECOND] | 150 [PACKETS /SECOND] |
| f2 | 50 | 500[BYTES] | 5[SECONDS] | 50 [PACKETS /SECOND] | 5000 [BYTES /SECOND] | 200 [PACKETS /SECOND] | 150 [PACKETS /SECOND] |

| FLOW TYPE | LAYER 2 HEADER INFORMATION | | | LAYER 3 HEADER INFORMATION | | | | LAYER 4 HEADER INFORMATION | PROCESSING MODE |
|---|---|---|---|---|---|---|---|---|---|
| | VLAN ID | UPRI | ADDITIONAL INFORMATION | LAYER 2 Unicast/Multicast | TOS | ADDITIONAL INFORMATION | LAYER 3 Unicast/Multicast | | |
| f1 | * | * | * | Unicast | * | * | Unicast | * | DISTRIBUTED PROCESSING |
| f2 | * | * | * | Multicast | * | * | Multicast | * | LOW LOADING |

NETWORK RELAY APPARATUS

CROSS-REFERENCE TO RELATED APPLICATIONS

The present application claims the priority based on Japanese Patent Application No. 2008-276586 filed on Oct. 28, 2008, the disclosure of which is hereby incorporated by reference in its entirety.

BACKGROUND OF THE INVENTION

1. Field of the Invention

The present invention relates to a network relay apparatus used for relay in a network.

2. Description of the Related Art

A tremendous increase of the Internet traffic accompanied with the advance of ICT (information and communication technology) leads to a significant increase of power consumption required for a network relay apparatus (for example, a LAN switch or a router). The conventional design policy of the network relay apparatus focuses more on the improvement of processing performance rather than the reduction of power consumption.

From the standpoint of environmental protection, it is highly demanded as the recent trend to reduce the power consumption of the network relay apparatus.

SUMMARY

It is thus required to provide a technique applicable to a network relay apparatus to reduce power consumption, while assuring high processing performance.

According to an aspect of the present invention, a network relay apparatus is provided. The network relay apparatus comprises: a plurality of distributed processing units configured to receive and send a packet from and to an external device; an integrated processing unit connected with the plurality of distributed processing units; and a mode selector configured to change over a processing mode of the network relay apparatus between a distributed processing mode and an integrated processing mode, based on at least either one of a load applied to the network relay apparatus and a packet type determined according to header information of the received packet, wherein (i) the distributed processing mode in which each of the distributed processing units performs destination search with each received packet and transfers the packet to the external device; and (ii) the integrated processing mode in which each of the distributed processing units transfers each received packet to the integrated processing unit without performing destination search with the received packet, and the integrated processing unit performing the destination search and transferring the packet to the external device via one of the distributed processing units.

According to this configuration, The network relay apparatus according to this aspect of the invention changes over the processing mode between the integrated processing mode with the low power consumption and the distributed processing mode with the high processing performance according to the amount of load applied to the network relay apparatus or according to the packet type of the packet received by the network relay apparatus. The network relay apparatus of this arrangement thus effectively reduces power consumption, while assuring the high processing performance.

The technique of the invention is not restrictively actualized by the network relay apparatus having any of the configurations and arrangements discussed above, but may be actualized by diversity of other applications including a network relay method corresponding to the network relay apparatus, a computer program configured to attain the functions of such a device or a method, as well as a recording medium with such a computer program recorded therein.

BRIEF DESCRIPTION OF THE DRAWINGS

FIG. 6 is an explanatory view showing one example of the distributed/integrated processing switchover table;

FIG. 7 is an explanatory view showing another example of the distributed/integrated processing switchover table;

FIG. 8 is an explanatory view showing one example of the statistical information table;

FIG. 20 is an explanatory view showing one example of the distributed/integrated processing switchover table adopted in the third embodiment;

DESCRIPTION OF THE PREFERRED EMBODIMENT

Next, aspects of the present invention will be described in the following order on the basis of embodiments:

A. First Embodiment

A1. General Configuration of Network Relay Apparatus

Figure 1:
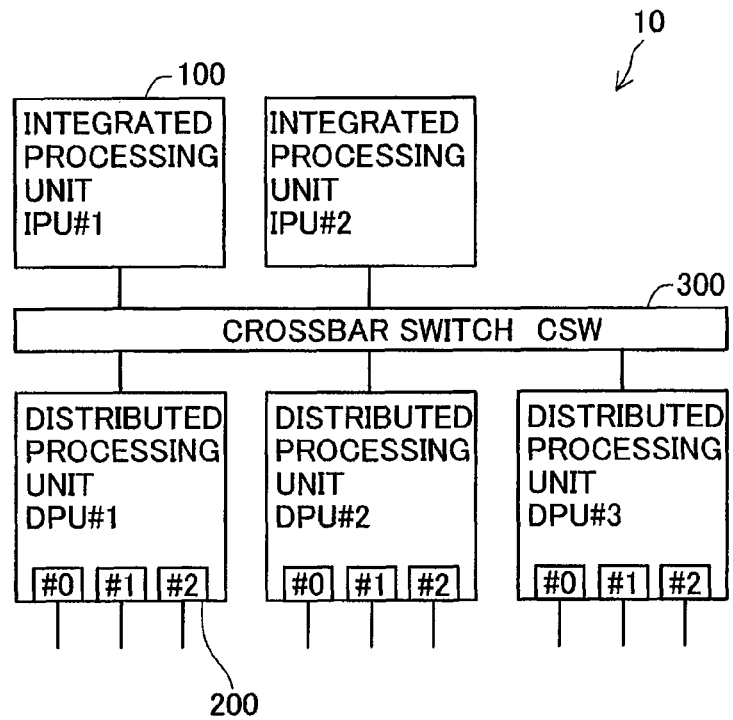
FIG. 1 is an explanatory view schematically illustrating the configuration of a network relay apparatus in a first embodiment of the invention.

FIG. 1 is an explanatory view schematically illustrating the configuration of a network relay apparatus 10 in a first embodiment of the invention. The network relay apparatus 10 of the embodiment is constructed as a LAN switch and has the functions of a bridge and a router. The network relay apparatus 10 includes two integrated processing units 100 (IPU#1 and IPU#2), three distributed processing units 200 (DPU#1, DPU#2, and DPU#3), and a crossbar switch 300 (CSW). Out of the two integrated processing units 100, one integrated processing unit IPU#1 is assigned as a master and the other integrated processing unit IPU#2 is assigned as a backup. The master integrated processing unit IPU#1 searches pathway information with regard to each packet received from one of the distributed processing units 200 and performs protocol management, overall control, and synchronization and updating of tables. The backup integrated processing unit IPU#2 stands by as a backup system of the integrated processing unit IPU#1. Each of the distributed processing units 200 has three physical lines (#0, #1, #2) to externally receive and send packets. The crossbar switch 300 relays a packet, in response to an instruction from any of the integrated processing units 100 and the distributed processing units 200. The two integrated processing units 100 and the three distributed processing unit 200 are interconnected via the crossbar switch 300. Alternatively the respective processing units 100 and 200 may be interconnected via a connection circuit other than the crossbar switch 300.

The network relay apparatus 10 has two processing modes, an integrated processing mode and a distributed processing mode. As described in detail below, in the integrated processing mode, the distributed processing unit 200 receiving a packet does not perform destination search, but the integrated processing unit 100 performs the destination search. In the distributed processing mode, on the other hand, the distributed processing unit 200 receiving a packet performs the destination search.

A2. Outline of Respective Processing Modes

Figure 2:
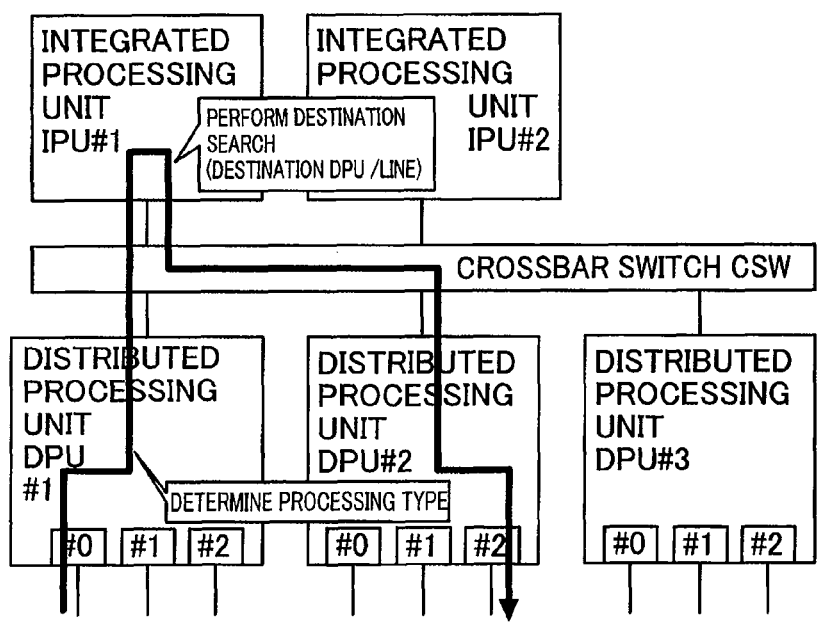
FIG. 2 is an explanatory view showing the network relay apparatus in the integrated processing mode.

FIG. 2 is an explanatory view showing the network relay apparatus 10 in the integrated processing mode. In this illustrated example, a packet is received via the physical line #0 of the distributed processing unit DPU#1 and is sent out from the physical line #2 of the distributed processing unit DPU#2 to an external device. In the description hereafter, the terminology 'packet input' and 'packet output' respectively mean that the network relay apparatus 10 receives a packet via a physical line and that the network relay apparatus 10 sends out a packet via a physical line.

In the integrated processing mode, the distributed processing unit DPU#1 does not perform destination search with regard to a received packet but transfers the received packet to the integrated processing unit IPU#1. The integrated processing unit IPU#1 receives the transferred packet and refers to a table (not shown) based on the pathway information of the received packet to perform the destination search with regard to the received packet. The destination search specifies: (i) the distributed processing unit 200 having a physical line used for output of the received packet; and (ii) the physical line used for the packet output. The integrated processing unit IPU#1 subsequently updates header information included in the received packet and transfers the packet with the updated header information to the specified distributed processing unit DPU#2 having the specified physical line used for the packet output. The specified distributed processing unit DPU#2 receives the transferred packet and outputs the received packet from the specified physical line #2, based on the header information included in the received packet. The structures of the integrated processing unit 100 and the distributed processing unit 200 and the series of processing performed in the integrated processing mode will be discussed later in detail.

In the integrated processing mode, the integrated processing unit 100 performs the destination search with regard to the received packet, in place of the distributed processing unit DPU#1. The distributed processing unit DPU#1 is thus required to activate only part of its functions (for example, the function of transferring packets). In one application, the integrated processing unit 100 may be designed to use a search circuit having the smaller power consumption required for the destination search than the power consumption required in the distributed processing unit 200. In such an application, this arrangement of the embodiment desirably reduces the total power consumption required in the whole network relay deice 10.

Figure 3:
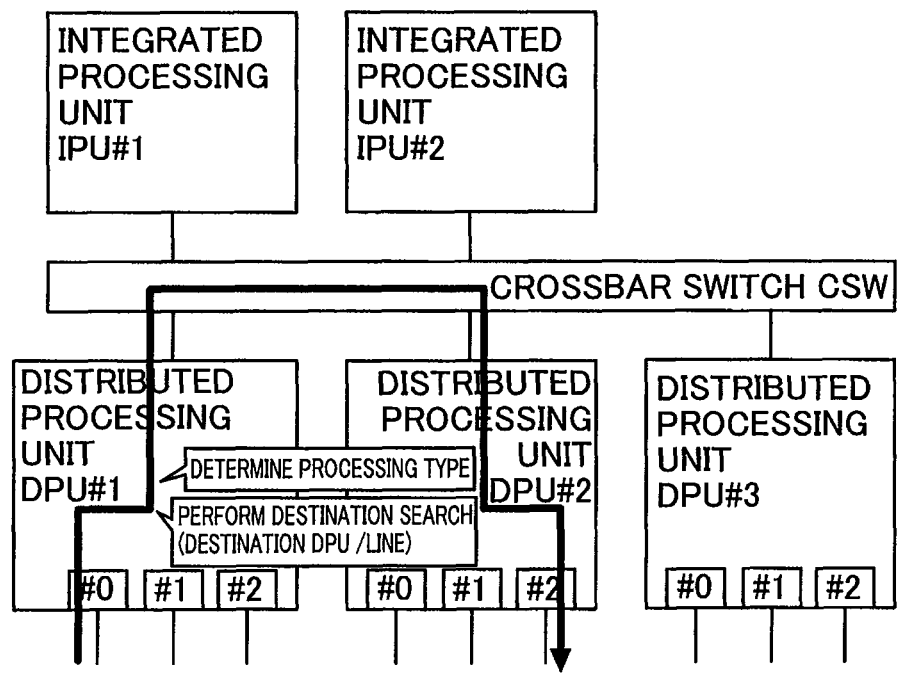
FIG. 3 is an explanatory view showing the network relay apparatus in the distributed processing mode.

FIG. 3 is an explanatory view showing the network relay apparatus 10 in the distributed processing mode. In the distributed processing mode, the distributed processing unit DPU#1 receiving a packet performs the destination search with regard to the received packet. The distributed processing unit DPU#1 subsequently updates header information included in the received packet and transfers the packet with the updated header information to the specified distributed processing unit DPU#2 having the specified physical line used for the packet output. The distributed processing unit DPU#2 receives the transferred packet and outputs the received packet from the specified physical line #2, based on the header information included in the received packet. The structure of the distributed processing unit 200 and the series of processing performed in the distributed processing mode will be discussed later in detail. In the distributed processing mode, the integrated processing unit IPU#1 performs series of processing other than the destination search (for example, protocol management, overall control, and synchronization and updating of tables).

The distributed processing mode does not require transfer of an input packet via the integrated processing unit IPU#1 and thus assures the high speed processing of the input packet.

Switchover of the processing mode between the integrated processing mode and the distributed processing mode is performed by a destination specifying process switchover module (discussed later) provided in the distributed processing unit 200. The details of this mode switchover process will be discussed later.

A3. Structures of Distributed Processing Unit and Integrated Processing Unit

Figure 4:
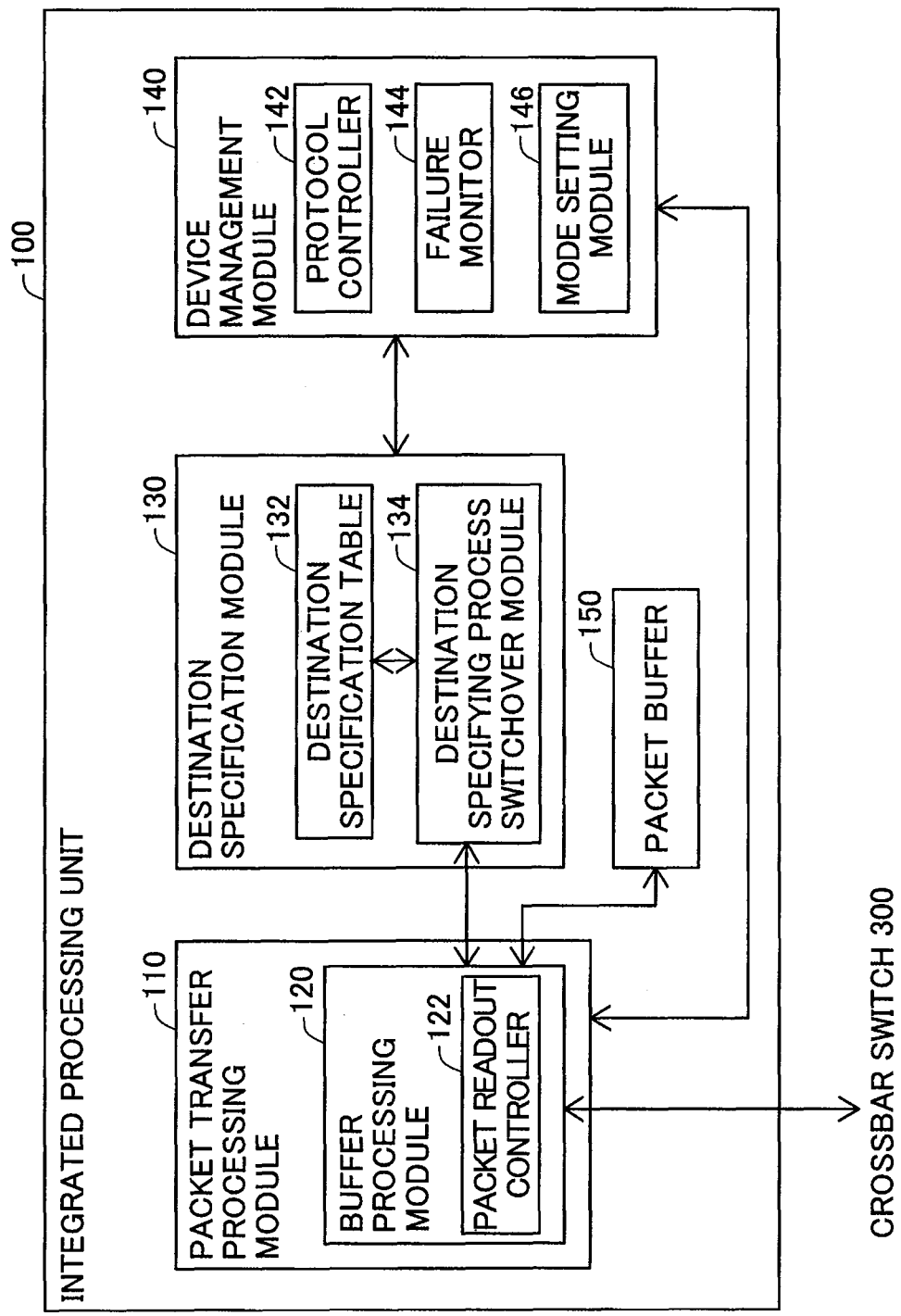
FIG. 4 is an explanatory view showing the schematic structure of the integrated processing unit.

FIG. 4 is an explanatory view showing the schematic structure of the integrated processing unit 100. The integrated processing unit 100 includes a packet transfer processing module 110, a destination specification module 130, a device management module 140, and a packet buffer 150. The packet buffer 150 is a buffer memory area set for temporary storage of packets.

The packet transfer processing module 110 has the function of transferring packets to the crossbar switch 300 and to the respective components included in the integrated processing unit 100. The packet transfer processing module 110 includes a buffer processing module 120. The buffer processing module 120 has a packet readout controller 122 and performs exchange of the header information with a destination specifying process switchover module 134 and input and output of packets from and to the packet buffer 150.

The destination specification module 130 has the function of specifying the destination of an input packet. The destination specification module 130 includes a destination specification table 132 and the destination specifying process switchover module 134. The destination specification table 132 is designed to store pathway information including a relay destination of each packet and is constructed in the form of, for example, a MAC table or a routing table. The destination specifying process switchover module 134 searches the destination specification table 132 based on header information included in each input packet to specify a transfer destination of the input packet.

The device management module 140 has the management function of the network relay apparatus 10. The device management module 140 includes a protocol controller 142, a failure monitor 144, and a mode setting module 146. The protocol controller 142 performs controls of protocols such as OSPF and RIP, creation of routing tables in dynamic routing control, and diverse series of layer 3-related processing including confirmation of existence between multiple network relay apparatuses 10. The failure monitor 144 monitors the conditions of the respective components included in the network relay apparatus 10. The mode setting module 146 monitors a statistical information table provided in the distributed processing unit 200 at regular intervals and updates the contents of a distributed/integrated processing switchover table provided in the distributed processing unit 200 according to the result of monitoring. This series of processing will be discussed later in detail.

Figure 5:
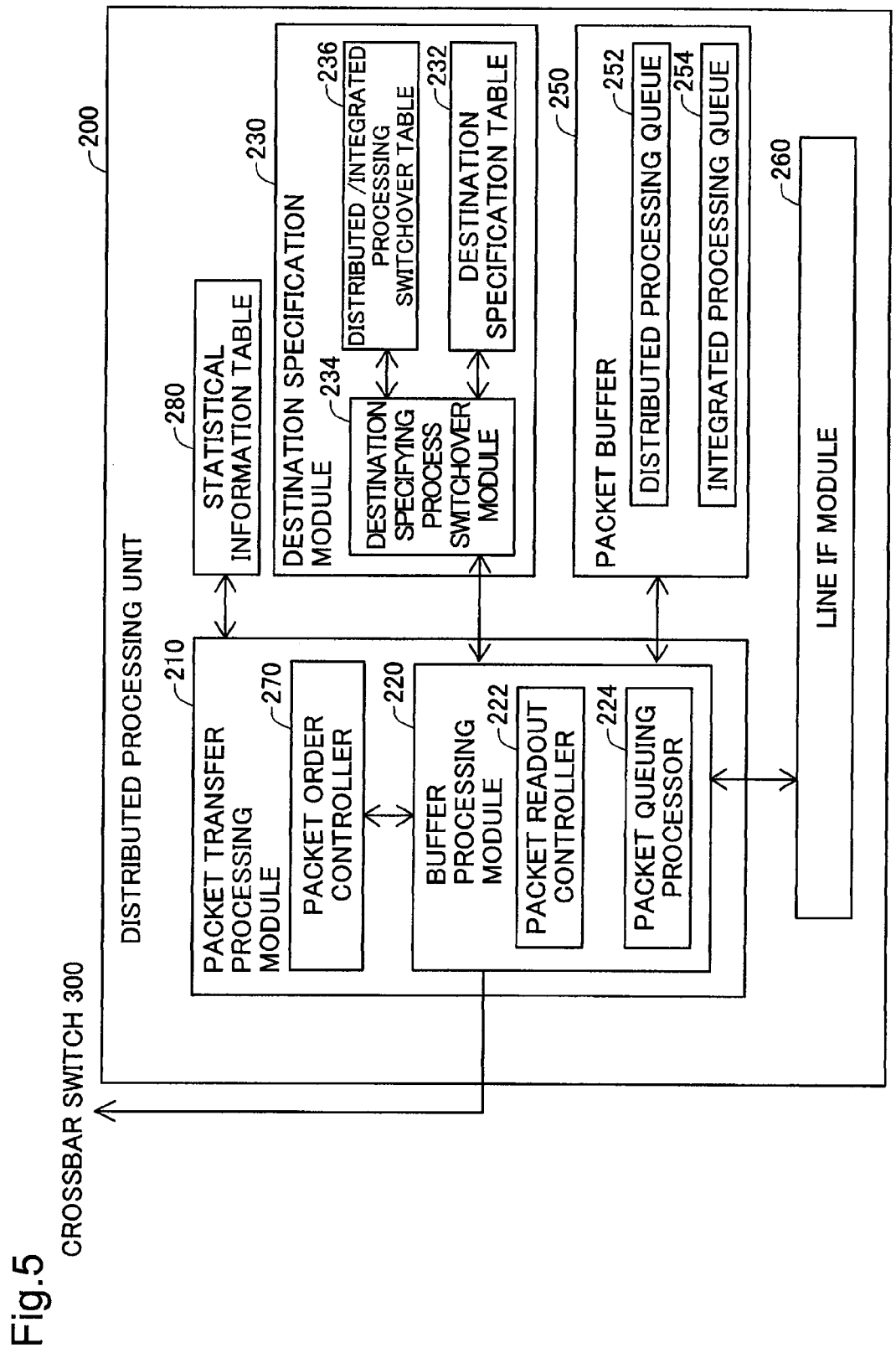
FIG. 5 is an explanatory view showing the schematic structure of the distributed processing unit.

FIG. 5 is an explanatory view showing the schematic structure of the distributed processing unit 200. The distributed processing unit 200 includes a packet transfer processing module 210, a destination specification module 230, a packet buffer 250, a line IF (interface) module 260, and a statistical information table 280. The packet buffer 250 has a distributed processing queue 252 and an integrated processing queue 254. The distributed processing queue 252 is set to accumulate packets that are to be processed in the distributed processing mode. The integrated processing queue 254 is set to accumulate packets that are to be processed in the integrated processing mode. The packet buffer 250 includes the distributed processing queue 252 and the integrated processing queue 254 as physical areas in this embodiment, although these queues may be provided as logical areas.

The packet transfer processing module 210 has the function of transferring packets to the crossbar switch 300 and to the respective components included in the distributed processing unit 200. The packet transfer processing module 210 includes a packet order controller 270 and a buffer processing module 220. The buffer processing module 220 has a packet readout controller 222 and a packet queuing processor 224. The packet readout controller 222 controls readout of packets from the distributed processing queue 252 and from the integrated processing queue 254. The packet queuing processor 224 accumulates each packet into a corresponding queue according to the determined processing type of the packet. According to a concrete procedure, the packet queuing processor 224 accumulates packets into the distributed processing queue 252 in the distributed processing mode, while accumulating packets into the integrated processing queue 254 in the integrated processing mode. The packet order controller 270 controls the packet readout controller 222 to read out a packet according to the determined processing type of the packet. The series of processing performed by the buffer processing module 220 and the packet order controller 270 will be discussed later in detail.

The destination specification module 230 has the function of specifying the destination of an input packet. The destination specification module 230 includes a destination specification table 232, a destination specifying process switchover module 234, and a distributed/integrated processing switchover table 236. The destination specification table 232 is designed to store pathway information including a relay destination of each packet and is constructed in the form of, for example, a MAC table or a routing table. The distributed/integrated processing switchover table 236 is designed to identify whether each input packet is to be processed in the distributed processing mode or in the integrated processing mode. The details of these tables will be discussed later. The destination specifying process switchover module 234 searches the distributed/integrated processing switchover table 236 with regard to each input packet to determine the processing type of the input packet. In the case of the distributed processing, the destination specifying process switchover module 234 further searches the destination specification table 232 based on header information included in the input packet to specify a transfer destination of the input packet. The statistical information table 280 is designed to store statistical information, such as a flow rate of each input packet, and is used in a mode switchover process described later. The details of this table will be discussed later. The line IF module 260 interfaces with the physical lines.

A4. Structures of Tables

FIG. 6 is an explanatory view showing one example of the distributed/integrated processing switchover table 236. The distributed/integrated processing switchover table 236 includes a flow type FTY, layer 2 header information L2HD, layer 3 header information L3HD, layer 4 header information L4HD, and a processing mode DD.

The flow type FTY stores a code of unequivocally identifying the type of a flow. In the embodiment, the terminology 'flow' represents a set of packets sortable into a group according to the header information of the packets. The layer 2 header information L2HD includes VLAN ID, UPRI, additional information L2OT, layer 2 multicast classification L2UM. The VLAN ID stores an identification code of a VLAN (virtual LAN or virtually grouped LAN) which the flow belongs to as one piece of flow identification information. The UPRI stores a packet priority or 'User Priority' in the layer 2. The additional information L2OT stores, for example, 'Type' or information for identifying a protocol in the upper layer 3. The layer 2 multicast classification L2UM stores unicast/multicast specification in the layer 2. The layer 3 header information L3HD includes TOS, additional information L3OT, and layer 3 multicast classification L3UM. The TOS stores 'Type of Service' or information used to specify the priority order of packet transmission as one piece of the flow identification information. The additional information L3OT stores, for example, 'Protocol' or information for identifying a protocol in the upper layer 4. The layer 3 multicast classification L3UM stores unicast/multicast specification in the layer 3. The layer 4 header information L4HD stores, for example, 'Port Number' or information for identifying an application program in the upper layers 5 through 7 as one piece of the flow identification information. The processing mode DD stores a processing type (integrated processing/distributed processing) determined with regard to each flow type FTY. The update control of the processing mode DD or the mode switchover process will be described later in detail. The conditions or the items set in the distributed/integrated processing switchover table 236 of this illustrated example are not restrictive but are only illustrative. Any arbitrary conditions or items may thus be set in the distributed/integrated processing switchover table 236. In one modification, the distributed/integrated processing switchover table 236 may additionally include information regarding a physical line which a packet is input from.

Entry of these conditions for grouping each flow into the respective condition fields specifies its flow type FTY. In the illustrated example of FIG. 6, a symbol '*' is stored in all the condition fields. The symbol '*' means any arbitrary setting. All the packets input into the network relay apparatus 10 are accordingly grouped into a 'flow type FTY=f1' and have the processing mode DD identified as 'integrated processing'.

In the illustrated example of FIG. 6, all the packets input into the network relay apparatus 10 are determined to belong to an identical flow type. In this case, the switchover of the processing mode DD is based on the amount of load applied to the network relay apparatus 10 (more specifically, the amount of packets received by the network relay apparatus 10). The switchover of the processing mode DD will be discussed later in detail.

FIG. 7 is an explanatory view showing another example of the distributed/integrated processing switchover table 236. In the illustrated example of FIG. 7, packets with 'VLAN ID=VID1' are grouped into a 'flow type FTY=f1' and have the processing mode DD identified as 'integrated processing'a. Packets with 'VLAN ID=VID2' are grouped into a 'flow type FTY=f2' and have the processing mode DD identified as 'distributed processing'.

When the packets input into the network relay apparatus 10 are classified into multiple different flow types, the switchover of the processing mode DD with regard to each flow type is based on the load of the flow type.

By referring to the distributed/integrated processing switchover table 236, the processing mode is changeable between the integrated processing mode with the low power consumption and the distributed processing mode with the high processing performance according to the characteristic of each packet type or according to the load of each packet type. The network relay apparatus of this embodiment thus desirably reduces the power consumption, while assuring the high processing performance.

FIG. 8 is an explanatory view showing one example of the statistical information table 280. The statistical information table 280 includes statistical information SI, an upper threshold UB, and a lower threshold LB with regard to each flow type. The flow type FTY is described previously with reference to FIGS. 6 and 7. The statistical information SI includes a number of accumulated packets SPC, a number of accumulated bytes SBC, a previous arrival time SLT, an average number of packets SPPS, and an average number of bytes SBPS. The number of accumulated packets SPC represents an integration value of the number of input packets with regard to each flow type FTY. The number of accumulated bytes SBC represents an integration value of the number of bytes of the input packets with regard to each flow type FTY. The previous arrival time SLT represents a time when a packet was input last time. The average number of packets SPPS represents the number of packets input per second. The average number of bytes SBPS represents the number of bytes of the input packets per second.

The upper threshold UB and the lower threshold LB represent an upper limit value and a lower limit value of the average number of packets SPPS and are used in the mode switchover process discussed later. In the illustrated example of FIG. 8, the average number of packets SPPS is used as an index representing the amount of load applied to the network relay apparatus 10. Alternatively the average number of bytes SBPS may be used as the index representing the amount of the applied load. In another example, the combination of the average number of packets SPPS with the average number of bytes SBPS may be used as the index representing the amount of the applied load. The contents or the items set in the statistical information table 280 of the illustrated example are not restrictive but are only illustrative. Any arbitrary contents or items may thus be set in the statistical information table 280.

A5. Structure of Frame

Figure 9:
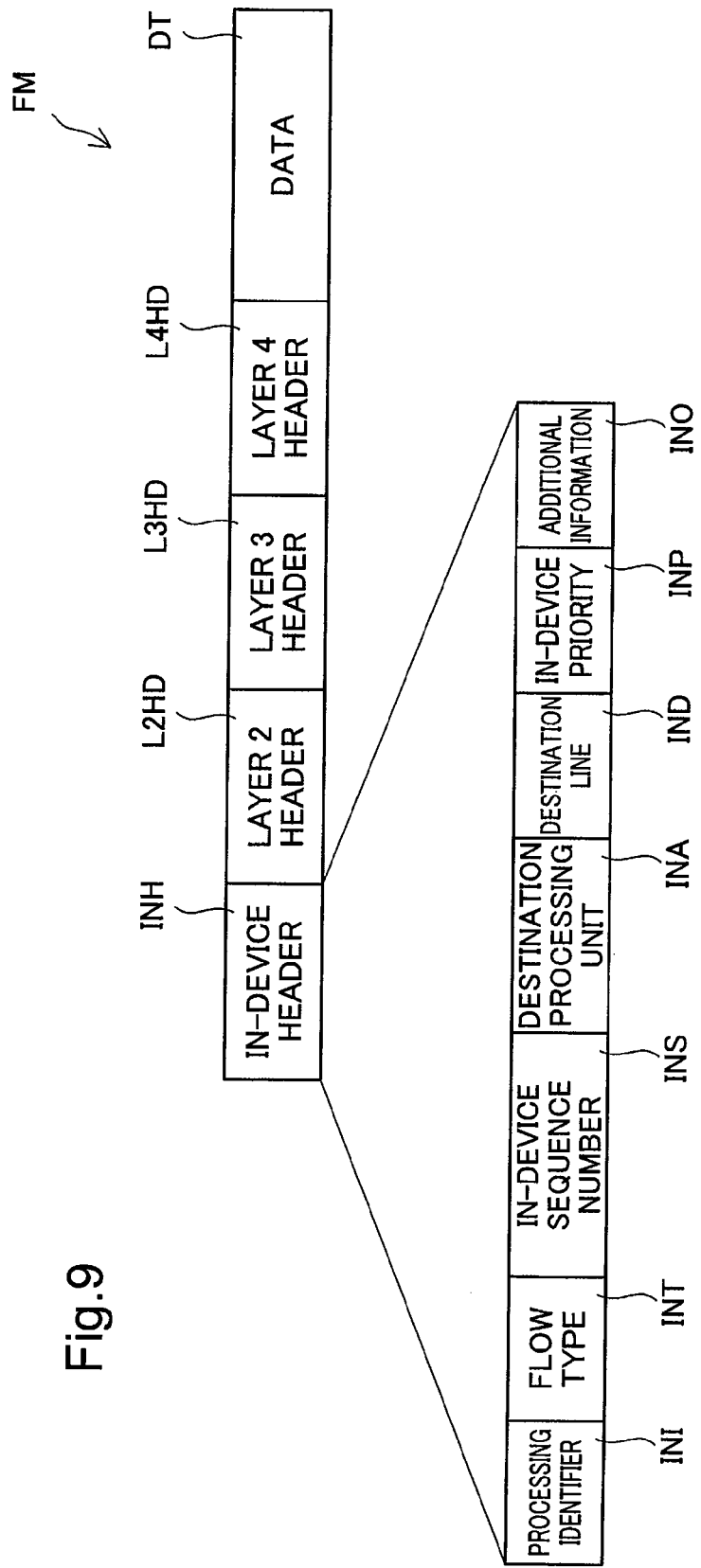
FIG. 9 is an explanatory view showing the structure of a frame FM adopted in the network relay apparatus.

FIG. 9 is an explanatory view showing the structure of a frame FM adopted in the network relay apparatus 10. The frame FM includes an in-device header INH, a layer 2 header L2HD, a layer 3 header L3HD, a layer 4 header L4HD, and data DT. The in-device header INH includes a processing identifier INT, a flow type INT, an in-device sequence number INS, a destination processing unit INA, a destination line IND, an in-device priority INP, and additional information INO.

The processing identifier INI is a code for identifying the processing mode of a packet between the integrated processing mode and the distributed processing mode. The flow type INT is a code for identifying the flow type FTY of the packet. The in-device sequence number INS represents a sequence number assigned by the distributed processing unit receiving an input packet. The destination processing unit INA is a code for specifying a processing unit as a transfer destination of the packet. The destination line IND is a code for specifying a physical line used for output of the packet. The in-device priority INP represents the priority of the packet in the network relay apparatus 10.

A6. Packet Processing Flow

A processing flow from input of a packet into the network relay apparatus 10 to output of the packet from the network relay apparatus 10 is described with reference to FIG. 2 (the integrated processing mode) and FIG. 3 (the distributed processing mode).

Figure 10:
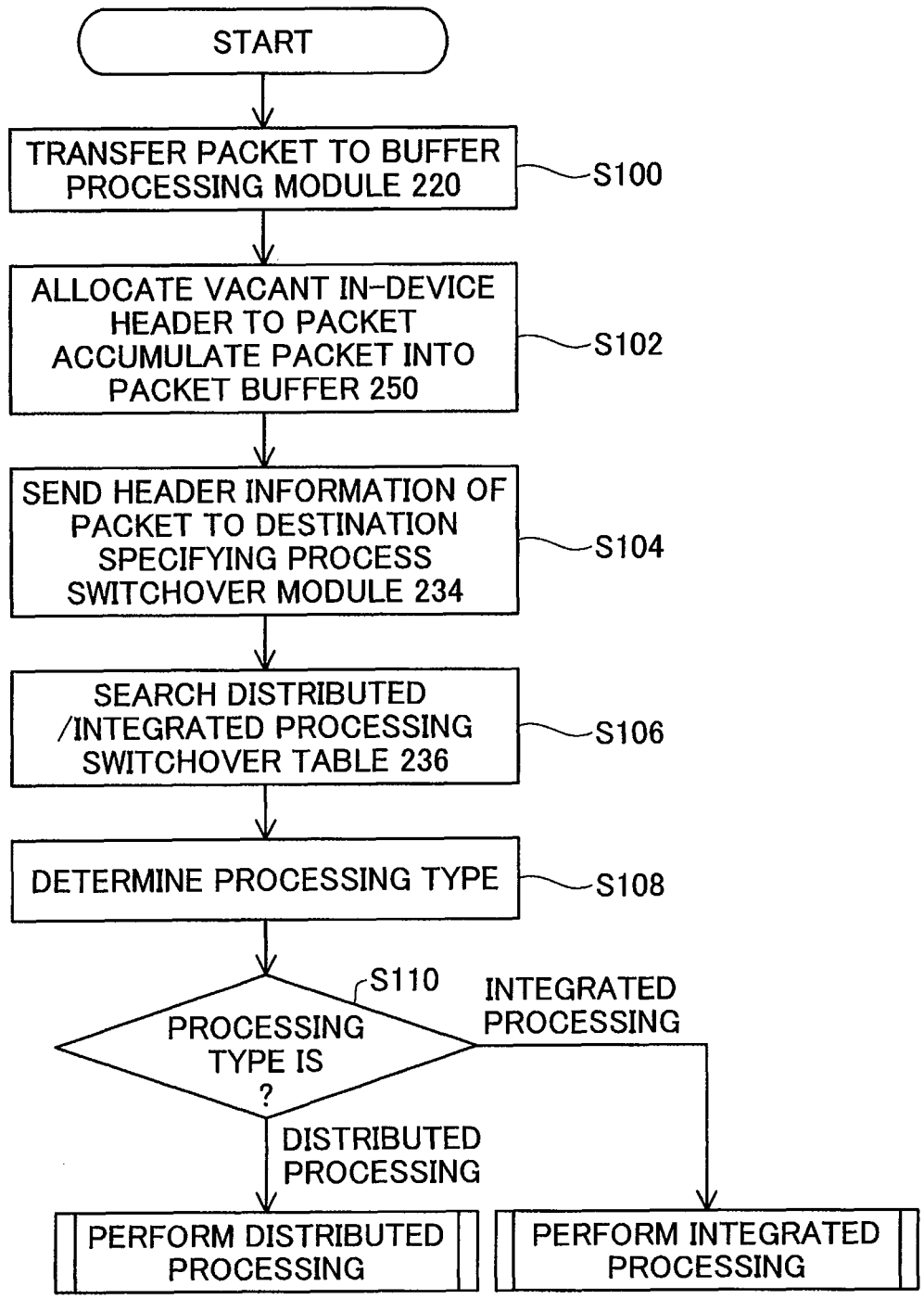
FIG. 10 is a flowchart showing a series of processing on a packet reception time.

FIG. 10 is a flowchart showing a series of processing on a packet reception time. It is assumed that a packet is received from the physical line #0 of the distributed processing unit DPU#1 (FIGS. 2 and 3). The line IF module 260 transfers the received packet to the buffer processing module 220 according to a packet processing priority included in the header of the packet (step S100). The buffer processing module 220 allocates a vacant in-device header INH to the received packet and accumulates the packet with the vacant in-device header INH into the packet buffer 250 (step S102). Concurrently the buffer processing module 220 sends the header information (L2HD, L3HD, L4HD) of the received packet to the destination specifying process switchover module 234 (step S104). The destination specifying process switchover module 234 searches the distributed/integrated processing switchover table 236 by the received header information of the packet as a key (step S106). The destination specifying process switchover module 234 selects the processing mode DD representing the determined processing type and specifies the settings of the flow type FTY and the sequence number (step S108). The processing flow is then branched off to two separate processing flows of the respective processing modes (step S110).

Figure 11:
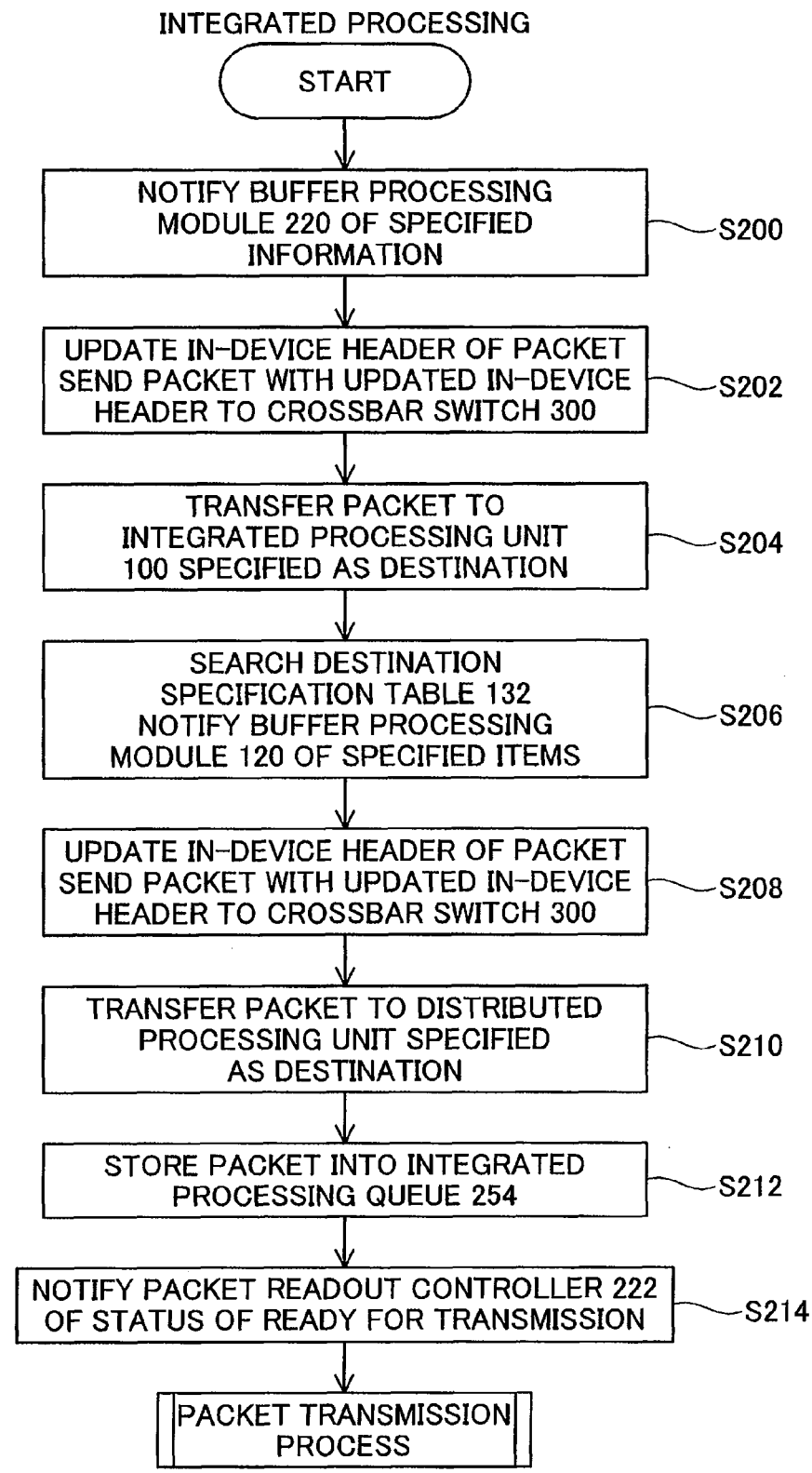
FIG. 11 is a flowchart showing a processing flow executed in the integrated processing mode.

FIG. 11 is a flowchart showing a processing flow executed in the integrated processing mode. The destination specifying process switchover module 234 of the distributed processing unit DPU#1 (FIG. 2) notifies the buffer processing module 220 of the processing mode DD, the flow type FTY, and the sequence number specified at step S108 in the flowchart of FIG. 10 (step S200). The buffer processing module 220 reads out a corresponding packet specified by the notified information from the packet buffer 250 and updates the in-device header INH of the read-out packet. According to a concrete procedure, the buffer processing module 220 respectively stores the setting of the processing mode DD, the setting of the flow type FTY, and the sequence number into the processing identifier INI, the flow type INT, and the in-device sequence number INS. The buffer processing module 220 transfers the packet with the updated in-device header INH to the crossbar switch 300 (step S202). The crossbar switch 300 then transfers the packet with the updated in-device header INH to the processing unit (integrated processing unit IPU#1) specified based on the destination processing unit INA included in the updated in-device header INH (step S204).

The buffer processing module 120 of the integrated processing unit IPU#1 (FIG. 2) accumulates the received packet into the packet buffer 150 and sends the header information of the received packet to the destination specifying process switchover module 134. The destination specifying process switchover module 134 searches the destination specification table 132 by the received header information of the packet as a key, in order to specify the following items given below:
 a) determination of transmission or discard of the packet
 b) processing priority in the device;
 c) processing unit as the transfer destination of the packet
 d) physical line used for output of the packet
 e) miscellaneous The destination specifying process switchover module 134 then notifies the buffer processing module 120 of the specification of these items (step S206). The buffer processing module 120 reads out a corresponding packet specified by the notified information from the packet buffer 150 and updates the in-device header INH of the read-out packet. According to a concrete procedure, the buffer processing module 120 respectively stores the setting of the processing priority in the device, the setting of the processing unit as the transfer destination of the packet, and the setting of the physical line used for output of the packet into the in-device priority INP, the destination processing unit INA, and the destination line IND. The buffer processing module 120 transfers the packet with the updated in-device header INH to the crossbar switch 300 (step S208). The crossbar switch 300 then transfers the packet with the updated in-device header INH to the processing unit (distributed processing unit DPU#2) specified based on the destination processing unit INA included in the updated in-device header INH (step S210).

The packet queuing processor 224 of the distributed processing unit DPU#2 (FIG. 2) stores the received packet into the integrated processing queue 254 in the packet buffer 250 (step S212). The packet queuing processor 224 then notifies the packet readout controller 222 of the status of ready for transmission (step S214). The processing flow then proceeds to a packet transmission process.

As described above, in the integrated processing mode, the integrated processing unit 100 collectively performs the search for the processing unit as the transfer destination and for the physical line used for output of the packet. The distributed processing unit DPU#1 receiving a packet thus simply transfers the received packet to the integrated processing unit IPU#1 after determination of the processing type of the received packet.

Figure 12:
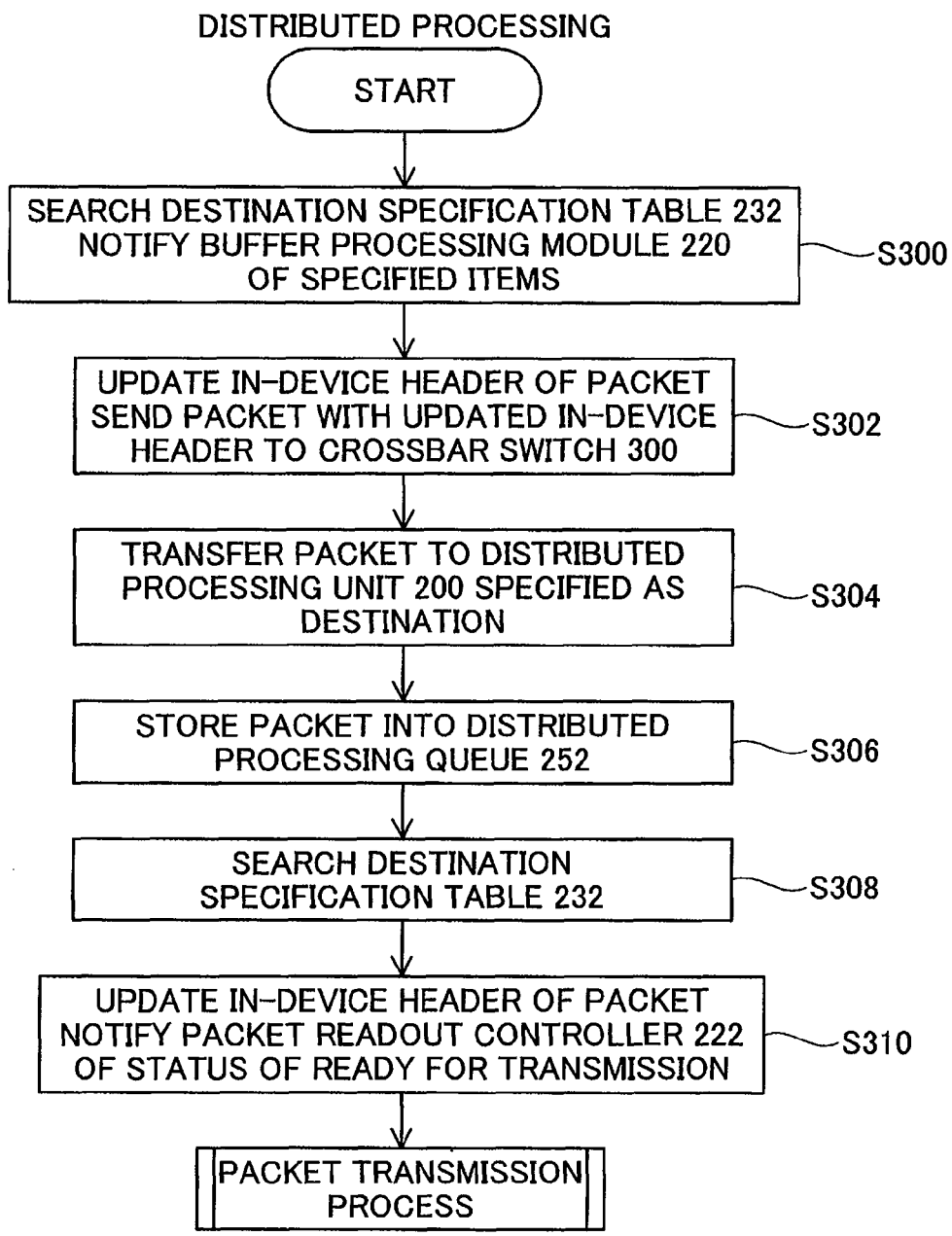
FIG. 12 is a flowchart showing a processing flow executed in the distributed processing mode.

FIG. 12 is a flowchart showing a processing flow executed in the distributed processing mode. The destination specifying process switchover module 234 of the distributed processing unit DPU#1 (FIG. 3) searches the destination specification table 232 by the received header information of the packet as a key, in order to specify the respective items a) through e) explained previously with reference to FIG. 11. The destination specifying process switchover module 234 notifies the buffer processing module 220 of the specification of these items (step S300). The buffer processing module 220 reads out a corresponding packet specified by the notified information from the packet buffer 250 and updates the in-device header INH of the read-out packet as concretely described above with reference to FIG. 11. The buffer processing module 220 transfers the packet with the updated in-device header INH to the crossbar switch 300 (step S302). The crossbar switch 300 then transfer the packet with the updated in-device header INH to the processing unit (distributed processing unit DPU#2) specified based on the destination processing unit INA included in the updated in-device header INH (step S304).

The packet queuing processor 224 of the distributed processing unit DPU#2 (FIG. 3) stores the received packet into the distributed processing queue 252 in the packet buffer 250 and sends the header information of the packet to the destination specifying process switchover module 234 (step S306). The destination specifying process switchover module 234 searches the destination specification table 232 by the received header information of the packet as a key, in order to specify the items a), b), and e) explained previously with reference to FIG. 11 and then notifies the buffer processing module 220 of the specification of these items (step S308). The buffer processing module 220 reads out a corresponding packet specified by the notified information from the packet buffer 250 and updates the in-device header INH of the read-out packet. The details of the update are described above with reference to FIG. 11. The buffer processing module 220 notifies the packet readout controller 222 of the status of ready for transmission (step S310). The processing flow then proceeds to the packet transmission process.

As described above, in the distributed processing mode, the distributed processing unit 200 (distributed processing unit DPU#1) receiving a packet performs the search for the processing unit as the transfer destination and for the physical line used for output of the packet.

Figure 13:
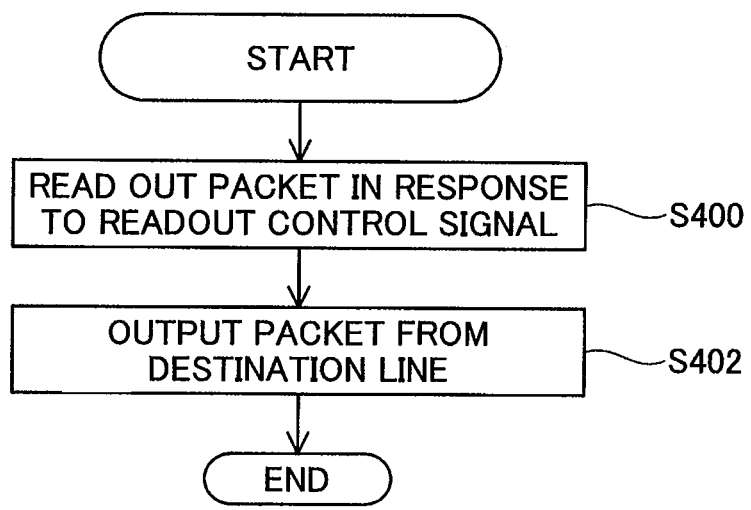
FIG. 13 is a flowchart showing the details of the packet transmission process of sending a packet to the external device.

FIG. 13 is a flowchart showing the details of the packet transmission process of sending a packet to the external device. The packet order controller 270 of the distributed processing unit DPU#2 (FIGS. 2 and 3) sends a readout control signal to the packet readout controller 222. In response to the received readout control single, the packet readout controller 222 reads out a packet from a corresponding processing queue and sends the read-out packet to the line IF module 260 (step S400). The process of generating the readout control signal (hereafter may be referred to as 'transmission order control') will be discussed in detail below. The line IF module 260 outputs the received packet from the physical line #2 specified for output of the packet (step S402).

Figure 14:
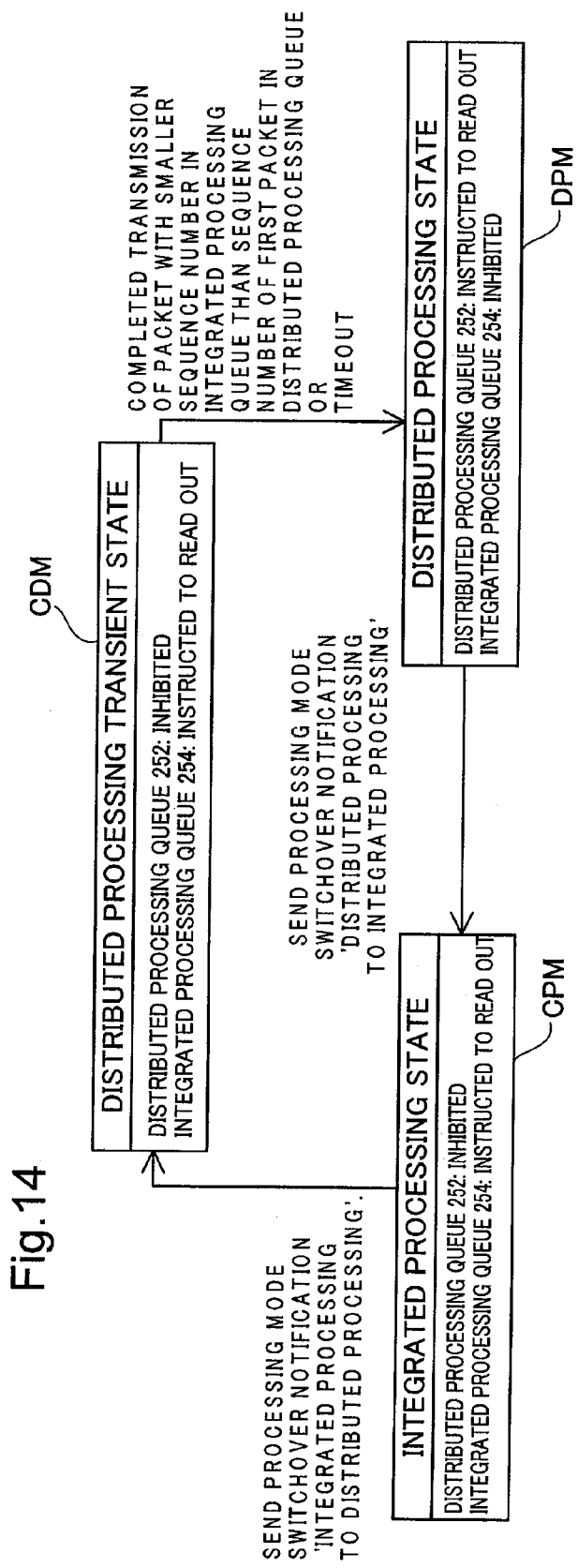
FIG. 14 is an explanatory view showing the details of the transmission order control performed by the packet order controller.

FIG. 14 is an explanatory view showing the details of the transmission order control performed by the packet order controller 270. The transmission order control includes an integrated processing state CPM, a distributed processing transient state CDM, and a distributed processing state DPM.

The integrated processing state CPM shows the behavior of the packet order controller 270 in the integrated processing mode. According to a concrete procedure, in the integrated processing state CPM, the packet order controller 270 gives a packet readout instruction to read out a packet from the integrated processing queue 254, while inhibiting readout of a packet from the distributed processing queue 252. The packet readout instruction is given to the packet readout controller 222 as discussed previously with reference to FIG. 13. In the case of a changeover of the processing mode from the integrated processing mode to the distributed processing mode by the mode switchover process discussed later, processing mode switchover notification 'integrated processing to distributed processing' is sent to the packet order controller 270. According to the processing mode switchover notification 'integrated processing to distributed processing', the processing state is shifted from the integrated processing state CPM to the distributed processing transient state CDM.

The distributed processing transient state CDM shows the behavior of the packet order controller 270 in a transient state from the integrated processing mode to the distributed processing mode. According to a concrete procedure, in the distributed processing transient state CDM, the packet order controller 270 preferentially performs readout of a packet from the integrated processing queue 254. Namely the packet order controller 270 gives a packet readout instruction to read out a packet from the integrated processing queue 254, while inhibiting readout of a packet from the distributed processing queue 252. Upon satisfaction of either one of the following conditions 1 and 2 in the distributed processing transient state CDM, the processing state is shifted from the distributed processing transient state CDM to the distributed processing state DPM:

Condition 1: The readout and transmission of all the packets, which have smaller sequence numbers than the in-device sequence number INS of a first packet stored in the distributed processing queue 252, from the integrated processing queue 254 is completed; and Condition 2: The processing time exceeds a predetermined time-out period.

The distributed processing state DPM shows the behavior of the packet order controller 270 in the distributed processing mode. According to a concrete procedure, in the distributed processing state DPM, the packet order controller 270 gives a packet readout instruction to read out a packet from the distributed processing queue 252, while inhibiting readout of a packet from the integrated processing queue 254. In the case of a changeover of the processing mode from the distributed processing mode to the integrated processing mode by the mode switchover process discussed later, processing mode switchover notification 'distributed processing to integrated processing' is sent to the packet order controller 270. According to the processing mode switchover notification 'distributed processing to integrated processing', the processing state is shifted from the distributed processing state DPM to the integrated processing state CPM.

The presence of the transient state from the integrated processing mode to the distributed processing mode or the distributed processing transient state CDM effectively prevents inversion of the transmission order of packets that may arise due to the difference in processing speed between the integrated processing mode and the distributed processing mode. The distributed processing mode generally has the higher processing speed than that of the integrated processing mode. An integrated processing transient state or a transient state from the distributed processing mode to the integrated processing mode is thus not provided in this embodiment, although the integrated processing transient state may be provided according to the requirements.

A7. Switchover of Relay Mode

Figure 15:
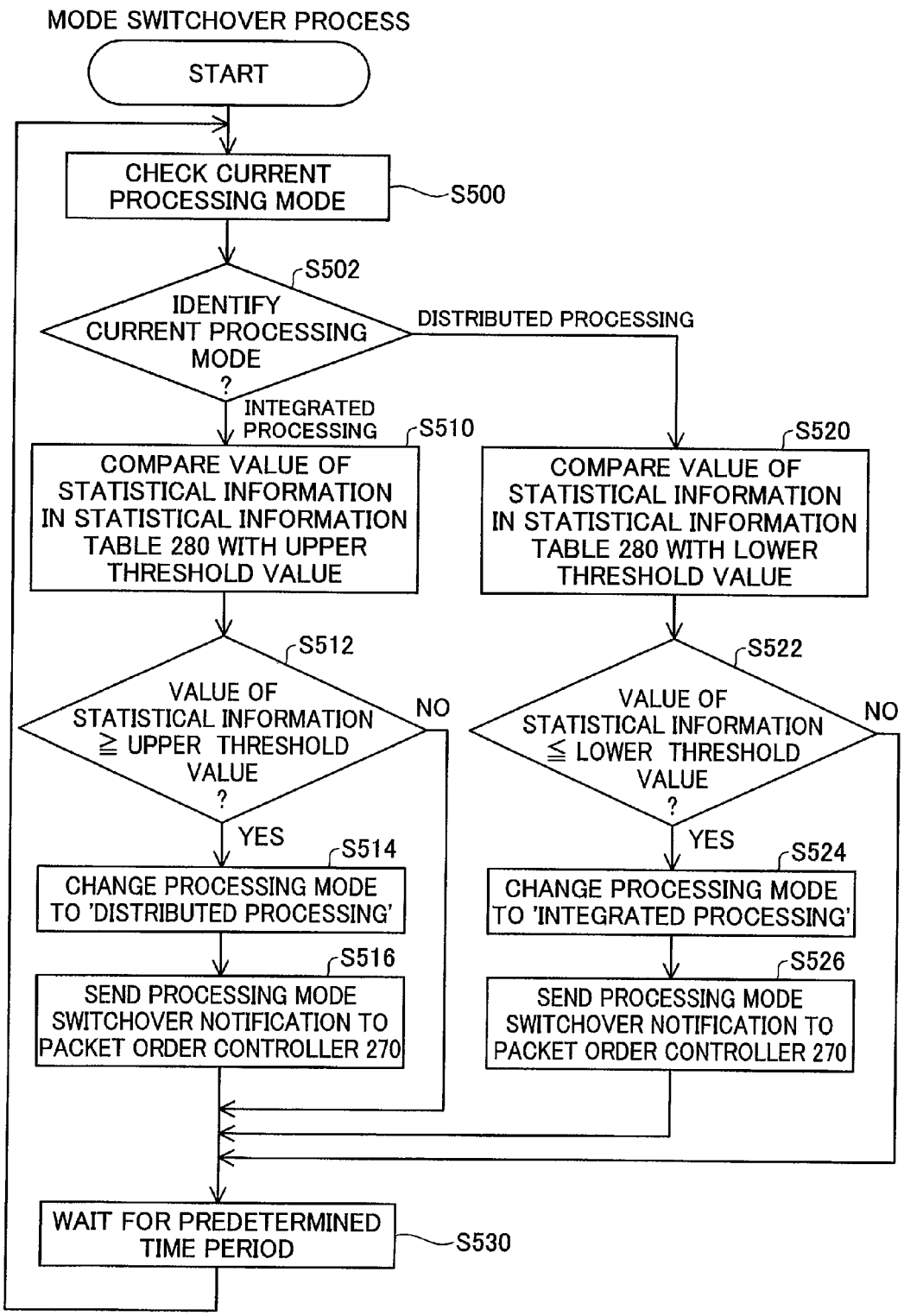
FIG. 15 is a flowchart showing the details of the mode switchover process with respect to each flow type.

FIG. 15 is a flowchart showing the details of the mode switchover process with respect to each flow type. The mode setting module 146 of the integrated processing unit IPU#1 assigned as the master integrated processing unit (FIG. 4) mainly takes charge of the processing of FIG. 15. The mode setting module 146 first checks the current processing mode (step S500). According to a concrete procedure, the mode setting module 146 reads the setting of the processing mode DD in the distributed/integrated processing switchover table 236 (FIGS. 6 and 7) of the distributed processing unit DPU#1 (step S502).

When the setting of the processing mode DD represents the 'integrated processing', the mode setting module 146 compares the value of the statistical information in the statistical information table 280 (FIG. 8) with the value of the upper threshold UB (step S510). In the illustrated example of FIG. 8, the average number of packets SPPS is compared with the value of the upper threshold UB. When it is determined at step S512 that the value of the statistical information is less than the value of the upper threshold UB, the mode setting module 146 waits for a predetermined time period (step S530) and returns the processing flow to step S500 to continue the monitoring. When it is determined at step S512 that the value of the statistical information is not less than the value of the upper threshold UB, on the other hand, the mode setting module 146 updates the setting of the processing mode DD to the 'distributed processing' in the distributed/integrated processing switchover table 236 (step S514). The mode processing module 146 then sends the processing mode switchover notification 'integrated processing to distributed processing' to the packet order controllers 270 of the distributed processing units DPU#1, DPU#2, and DPU#3 (step S516). The mode setting module 146 waits for the predetermined time period (step S530) and returns the processing flow to step S500 to continue the monitoring.

When the setting of the processing mode DD represents the 'distributed processing', on the other hand, the mode setting module 146 compares the value of the statistical information in the statistical information table 280 with the value of the lower threshold LB (step S520). In the illustrated example of FIG. 8, the average number of packets SPPS is compared with the value of the lower threshold LB. When it is determined at step S522 that the value of the statistical information is greater than the value of the lower threshold LB, the mode setting module 146 waits for the predetermined time period (step S530) and returns the processing flow to step S500 to continue the monitoring. When it is determined at step S522 that the value of the statistical information is not greater than the value of the lower threshold LB, on the other hand, the mode setting module 146 updates the setting of the processing mode DD to the 'integrated processing' in the distributed/integrated processing switchover table 236 (step S524). The mode processing module 146 then sends the processing mode switchover notification 'distributed processing to integrated processing' to the packet order controllers 270 of the distributed processing units DPU#1, DPU#2, and DPU#3 (step S526). The mode setting module 146 waits for the predetermined time period (step S530) and returns the processing flow to step S500 to continue the monitoring.

In the description above, the mode switchover process sets the processing mode in the distributed processing unit DPU#1, based on the contents of the distributed/integrated processing switchover table 236 shown in FIG. 6. The mode switchover process of this embodiment may also be performed with respect to each flow type to set the processing mode based on the contents of the distributed/integrated processing switchover table 236 shown in FIG. 7.

In the illustrated example of FIG. 6, all the packets input into the network relay apparatus 10 belong to an identical flow type. The changeover of the processing mode is accordingly based on only the amount of load applied to the network relay apparatus 10. In the illustrated example of FIG. 7, on the other hand, the packets input into the network relay apparatus 10 are classified into multiple different flow types. The changeover of the processing mode is thus based on the load of each flow type. In one application, the distributed/integrated processing switchover table 236 may be designed to unconditionally activate a preset processing mode (for example, the distributed processing mode) for packets belonging to a specific flow type (for example, a multicast flow or a broadcast flow), irrespective of the load level of the specific flow type. In the configuration of the first embodiment, the mode setting module 146 works in cooperation with the destination specifying process switchover module 234 to attain the function of the mode selector in the claims of the invention. As clearly understood from the above explanation, it is preferable to change over the processing mode based on at least either one of the amount of load applied to the network relay apparatus and the flow type or the packet type.

As described above, the network relay apparatus of the first embodiment changes over the processing mode between the integrated processing mode with the low power consumption and the distributed processing mode with the high processing performance according to the amount of load applied to the network relay apparatus or according to the packet type of the packet received by the network relay apparatus. The network relay apparatus of this arrangement desirably reduces the power consumption, while assuring the high processing performance.

B. Second Embodiment

Figure 16:
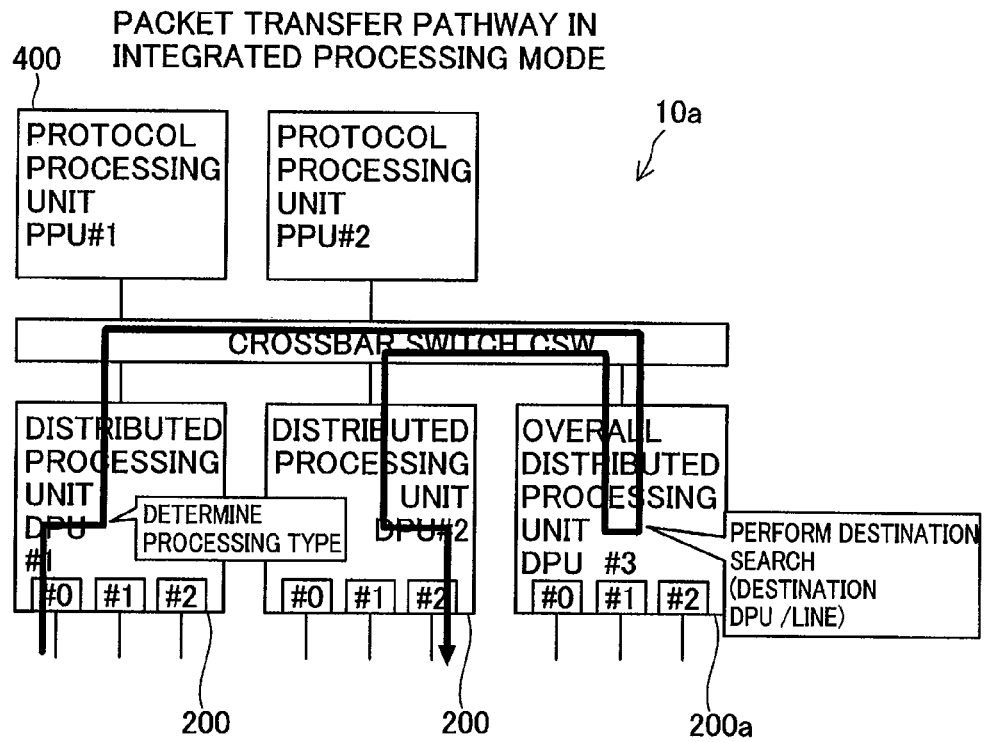
FIG. 16 is an explanatory view schematically illustrating the configuration of a network relay apparatus in a second embodiment.

FIG. 16 is an explanatory view schematically illustrating the configuration of a network relay apparatus 10a in a second embodiment. The primary difference from the configuration of the first embodiment shown in FIGS. 1 and 2 is that the network relay apparatus 10a of the second embodiment has an overall distributed processing unit 200a and protocol processing units 400, in place of the integrated processing units 100. The protocol processing unit 400 performs the protocol management, the overall control, and the synchronization and updating of the tables, among the various functions of the integrated processing unit 100 discussed previously with reference to FIG. 1. The distributed processing unit DPU#3 assigned as the overall distributed processing unit 200a performs the destination search with regard to each packet, among the various functions of the integrated processing unit 100 discussed previously with reference to FIG. 1. The overall distributed processing unit 200a accordingly functions as a sort of the integrated processing unit.

In the integrated processing mode, the distributed processing unit DPU#1 determines the processing type of an input packet. When the determined processing type is the 'integrated processing', the packet is transferred from the distributed processing unit DPU#1 to the overall distributed processing unit 200a via a crossbar switch CSW. The distributed processing unit DPU#3 receives the transferred packet and performs a series of processing similar to the processing performed by the integrated processing unit IPU#1 as described previously with reference to FIG. 2. The operations of the network relay apparatus 10a in the distributed processing mode are similar to those discussed previously with reference to FIG. 3.

The network relay apparatus of the second embodiment effectively reduces the power consumption, while assuring the high processing performance, like the network relay apparatus of the first embodiment. In the configuration of the second embodiment, the overall distributed processing unit 200a undertakes part of the functions performed by the integrated processing unit 100 of the first embodiment. This arrangement desirably lowers the total production cost of the network relay apparatus.

C. Third Embodiment

Figure 17:
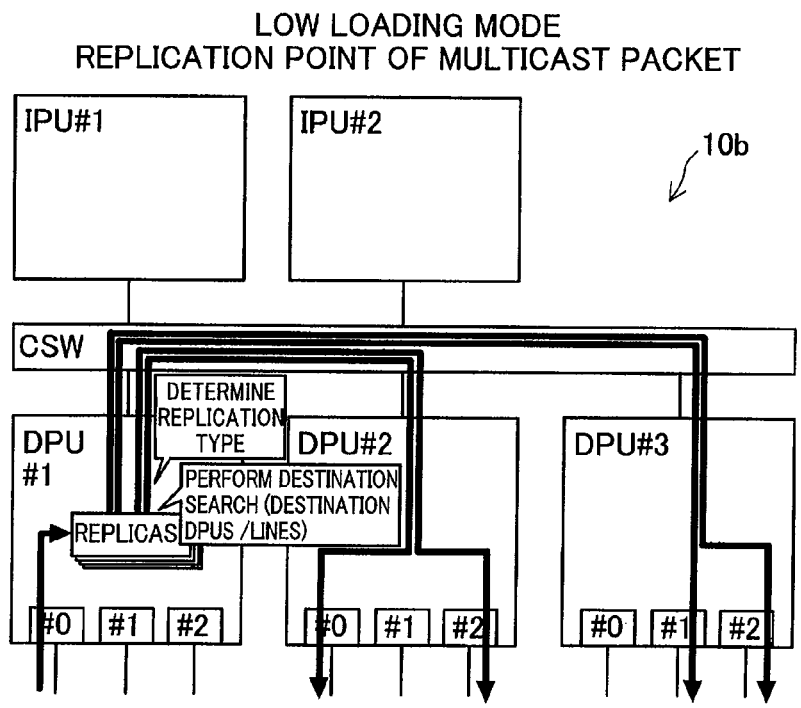
FIG. 17 is an explanatory view schematically illustrating the configuration of a network relay apparatus in a third embodiment.

FIG. 17 is an explanatory view schematically illustrating the configuration of a network relay apparatus 10b in a third embodiment. The structures of the respective constituents (the integrated processing units 100, the distributed processing units 200, and the crossbar switch 300) in the network relay apparatus 10b of the third embodiment are identical with those in the network relay apparatus 10 of the first embodiment. The primary difference from the first embodiment is that the network relay apparatus 10b of the third embodiment has a low loading mode and a high loading mode for the distributed processing. FIG. 17 shows a series of operations in response to input of a multicast packet from the physical line #0 of the distributed processing unit DPU#1. The physical lines #0 and #1 of the distributed processing unit DPU#2 and the physical lines #1 and #2 of the distributed processing unit DPU#3 are specified as distribution destinations of the input multicast packet.

The distributed processing unit DPU#1 first determines a replication type of an input multicast packet. The replication type has two modes, the low loading mode and the high loading mode, and is determined according to the number of packets to be processed, as discussed later in detail. When the replication type is the low loading mode, the distributed processing unit DPU#1 searches the pathway information to specify the distributed processing units and the physical lines as the transfer destinations of the input multicast packet. The distributed processing unit DPU#1 subsequently replicates the multicast packet to generate a packet replica, updates the header information of the generated packet replica, and transfers the packet replica with the updated header information to the distributed processing unit specified as the transfer destination. The distributed processing unit DPU#1 repeats such replication of the input multicast packet and transfer of the packet replica a specific number of times that corresponds to the number of the physical lines specified for output of the multicast packet (four times in the illustrated example of FIG. 17).

Figure 18:
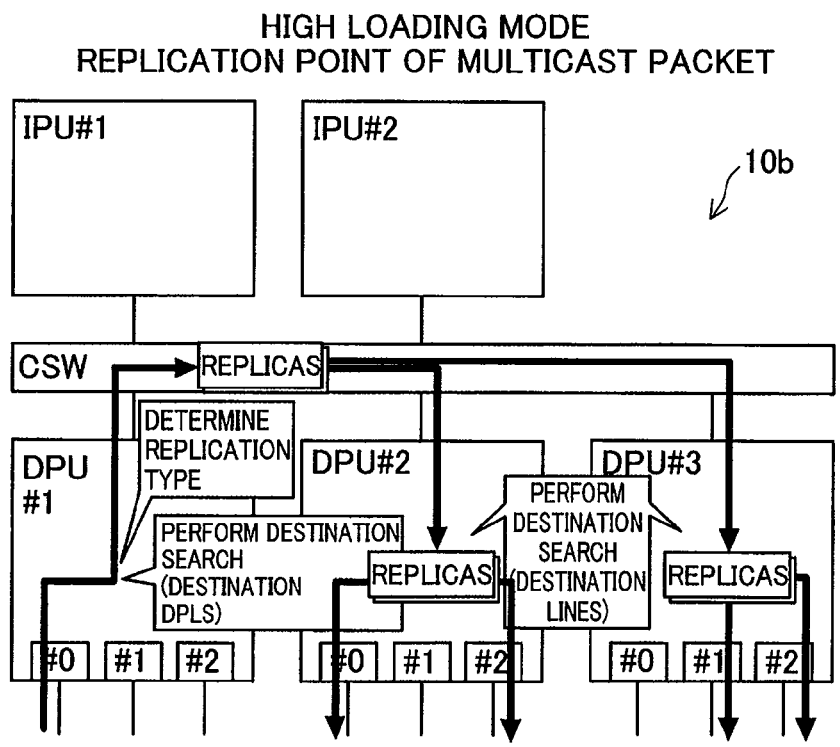
FIG. 18 is an explanatory view showing the network relay apparatus in the high loading mode.

FIG. 18 is an explanatory view showing the network relay apparatus 10b in the high loading mode. In the high loading mode, the distributed processing unit DPU#1 searches the pathway information to specify the distributed processing units as the transfer destinations of the input multicast packet. Retrieval of the physical lines used for output of the packet is not required in the high loading mode. The distributed processing unit DPU#1 transfers the input multicast packet to the crossbar switch CSW. In response to an instruction given by the distributed processing unit DPU#1, the crossbar switch CSW replicates the multicast packet to generate a packet replica and transfers the packet replica to the distribution processing unit specified as the transfer destination. The distributed processing unit receiving the packet replica searches the pathway information to specify the physical lines used for output of the packet. Such replication of the multicast packet and output of the packet replica is repeated a specific number of times that corresponds to the number of physical lines specified for output of the multicast packet.

Figure 19:
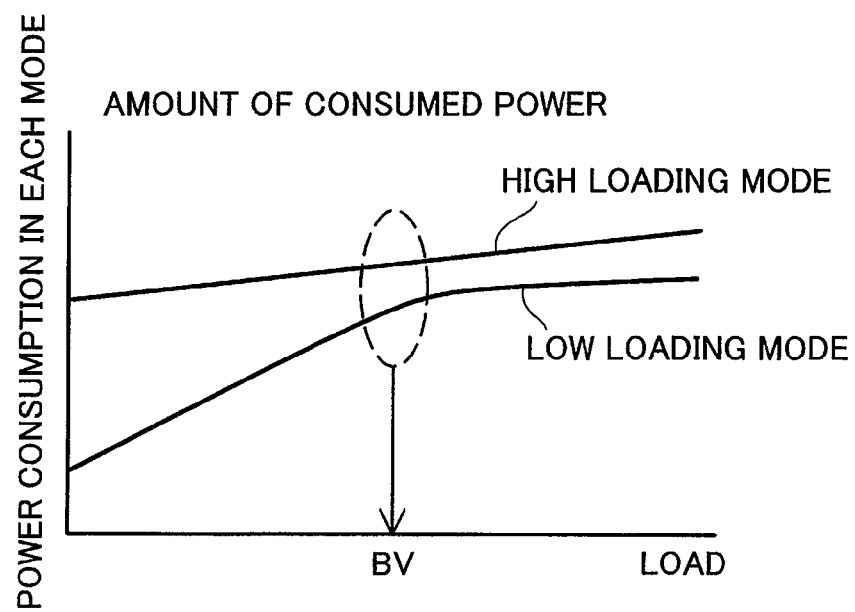
FIG. 19 is a graph showing a changeover criterion between the low loading mode and the high loading mode.

FIG. 19 is a graph showing a changeover criterion between the low loading mode and the high loading mode, with the amount of consumed power as ordinate and the load as abscissa. The load is represented by the number of packets to be processed per unit time. The number of packets to be processed per unit time is obtainable from, for example, information used for creation of a multicast table.

In the high loading mode (FIG. 18), the crossbar switch CSW is activated in a replication mode. The high loading mode accordingly requires high power consumption even for a small number of packets to be processed, but advantageously allows for high-speed packet replication by taking advantage of the characteristics of the crossbar switch CSW.

In the low loading mode (FIG. 17), on the other hand, only the distributed processing unit 200 (distributed processing unit DPU#1) receiving an input packet performs the packet replication. The low loading mode accordingly has low power consumption when there are a small number of packets to be processed. The disadvantage is that the distributed processing unit 2000 has only the limited processing performance and may thus be incapable of processing a large number of packets.

It is preferable to change over the replication type from the low loading mode to the high loading mode at a specific point BV where the processing performance of the distributed processing unit 200 still has some margin in the low loading mode. In the changeover criterion of FIG. 19, the changeover of the replication type between the low loading mode and the high loading mode is based on the load level computed from the number of packets input into the network relay apparatus 10b. Any arbitrary criterion may be adopted for the changeover of the replication type. In one modification, the changeover of the replication type may be based on the load level computed from the number of packets output from the network relay apparatus 10b.

FIG. 20 is an explanatory view showing one example of the distributed/integrated processing switchover table 236 adopted in the third embodiment. The details of this table are described previously with reference to FIG. 6. In the illustrated example of FIG. 20, unicast packets in the layer 2 and in the layer 3 belong to a 'flow type FTY=f1' and have the processing mode DD identified as the 'distributed processing mode'. Multicast packets in the layer 2 and in the layer 3 belong to a 'flow type FTY=f2' and have the processing mode DD identified as the 'low loading mode'. The changeover of the replication type between the high loading mode and the low loading mode is performed by a procedure similar to the mode switchover process described above with reference to FIG. 15.

The network relay apparatus of the third embodiment effectively reduces the power consumption, while assuring the high processing performance, like the network relay apparatus of the first embodiment. In the configuration of the third embodiment, the replication type is changed over between the low loading mode with the low power consumption and the high loading mode with the high processing performance. This arrangement desirably reduces the power consumption of the network relay apparatus in the process of relaying multicast packets.

D. Modifications

The embodiments and their applications discussed above are to be considered in all aspects as illustrative and not restrictive. There may be many modifications, changes, and alterations without departing from the scope or spirit of the main characteristics of the present invention. Some examples of possible modification are given below.

D1. Modification 1

In the embodiments discussed above, the processing mode is changed over between the integrated processing mode and the distributed processing mode without any differentiation between the functions of the network relay apparatus as a bridge in the layer 2 and as a router in the layer 3. This application of the changeover of the processing mode is, however, neither essential nor restrictive but may be modified arbitrarily. In one modification, the distributed processing is unconditionally performed in the layer 2, whereas the processing mode is changed over between the integrated processing mode and the distributed processing mode in the layer 3.

D2. Modification 2

In the embodiments discussed above, the mode setting module is provided in each integrated processing unit. The mode setting module is, however, not restrictively located in the integrated processing unit but may be provided at any arbitrary position. For example, the mode setting module may be provided in each distributed processing unit or may be provided as an independent component in the network relay apparatus. The former modified structure of locating the mode setting module in each distributed processing unit desirably reduces the load of monitoring between the respective processing units.

D3. Modification 3

The network relay apparatus of the third embodiment has the two replication modes (the low loading mode and the high loading mode), in addition to the two relay mode (the integrated processing mode and the distributed processing mode) as discussed above. This application is, however, neither essential nor restrictive but may be modified arbitrarily. The relay modes and the replication modes may be independently adopted in the network relay apparatus. For example, the network relay apparatus may be designed to have only the two replication modes.

D4. Modification 4

In the embodiments discussed above, the respective distributed processing units have the distributed/integrated processing switchover tables of the same contents. This application is, however, neither essential nor restrictive but may be modified arbitrarily. In one modification, the respective distributed processing units may have the distributed/integrated processing switchover tables of different contents. The processing type may be determined according to the amount of load applied to each distributed processing unit. Each of the distributed processing units may be designed to have multiple different distributed/integrated processing switchover tables.

D5. Modification 5

In the embodiments discussed above, the processing type is changed over according to the amount of load applied to the network relay apparatus. The criterion for changing over the processing type is, however, not restricted to the amount of load applied to the network relay apparatus but may be any arbitrary condition. In one application, in the event of some failure arising in the integrated processing unit in the integrated processing mode, the processing mode may be changed over from the integrated processing mode to the distributed processing mode.

What is claimed is:
1. A network relay apparatus, comprising:
a plurality of distributed processing units configured to be coupled to a network and to receive and send a packet from and to an external device via a network port;
an integrated processing unit connected to the plurality of distributed processing units; and
a mode selector configured to change over a processing mode of the network relay apparatus between a distributed processing mode and an integrated processing mode, based on at least either one of a load applied to the network relay apparatus and a packet type determined according to header information of the received packet, wherein
(i) in the distributed processing mode, each of the distributed processing units performs a destination search with each received packet and transfers the packet to the external device; and
(ii) in the integrated processing mode, each of the distributed processing units transfers each received packet to the integrated processing unit without performing a destination search with the received packet, and the integrated processing unit performs the destination search and transfers the packet to the external device via one of the distributed processing units.

2. The network relay apparatus according to claim 1, wherein the mode selector changes over the processing mode between the distributed processing mode and the integrated processing mode with each determined packet type.

3. The network relay apparatus according to claim 2, wherein the mode selector changes over the processing mode between the distributed processing mode and the integrated processing mode with each determined packet type according to a load of the packet type.

4. The network relay apparatus according to claim 1, wherein each of the distributed processing units allocates an in-device sequence number to a received packet,
each of the distributed processing units having a distributed processing queue for accumulation of packets received in the distributed processing mode and an integrated processing queue for accumulation of packets received in the integrated processing mode, as queues arranged to temporarily store packets with the in-device sequence numbers allocated thereto, and
in a transient state from the distributed processing mode to the integrated processing mode, each of the distributed processing units preferentially performing readout of packets from the integrated processing queue and starting readout of packets from the distributed processing queue only after completion of readout of all specific packets, which have smaller in-device sequence numbers than a sequence number of a preset packet stored in the distributed processing queue, from the integrated processing queue.

5. The network relay apparatus according to claim 1, wherein in the integrated processing mode, a specific distributed processing unit selected in advance among the distributed processing units is assigned as the integrated processing unit, and
the assigned integrated processing unit receives a packet from the external device and performs destination search with the received packet.

6. A network relay apparatus according to claim 1, wherein:
a crossbar switch is connected with the plurality of distributed processing units, and
wherein in the distributed processing mode:
the mode selector is further configured to change over a processing mode of the network relay apparatus between a low loading mode and a high loading mode, based on at least either one of an amount of load applied to the network relay apparatus and a packet type determined according to header information of a received multicast packet,
in the low loading mode, each of the distributed processing units performs destination search of a received multicast packet, replicates the received multicast packet to generate a specific number of packet replicas corresponding to a number of distribution destinations, and the transfers the generated packet replicas to the external device, and
in the high loading mode, each of the distributed processing units performs the destination search of the received multicast packet, the crossbar switch replicates the received multicast packet in response to an instruction from the distributed processing unit to generate a specific number of packet replicas corresponding to a number of the distributed processing units activated to relay the packet replicas to distribution destinations and transferring the generated packet replicas to the distributed processing units activated to relay the packet replicas to the distribution destinations, and each of the distributed processing units receiving one of the packet replicas, re-replicating the received packet replica to generate a certain number of re-replicated packet replicas corresponding to a number of the distribution destinations and transferring the re-replicated packet replicas to the external device.

7. The network relay apparatus according to claim 6, wherein the mode selector changes over the processing mode between the low loading mode and the high loading mode with each determined packet type.

8. The network relay apparatus according to claim 7, wherein the mode selector changes over the processing mode between the low loading mode and the high loading mode with each determined packet type according to a load of the packet type.

9. The network relay apparatus according to claim 6,
wherein the mode selector changes over a processing mode of the network relay apparatus between a low loading mode and a high loading mode during the distributed processing mode.

10. A network relay apparatus, comprising:
a plurality of distributed processing units configured to be coupled to a network and to receive and send a packet from and to an external device;
an integrated processing unit connected to the plurality of distributed processing units; and
a selector configured to assign a destination search to be performed for each received packet from the network to one of the distributed processing units and the integrated processing unit based on a load applied to the network relay apparatus,
if the distributed processing unit is assigned to perform the destination search, the distributed processing unit performs a destination search for each received packet and transfers the packet to the external device,
if the integrated processing unit is assigned to perform the destination search, the distributed processing units transfers each received packet to the integrated processing unit without performing a destination search for the received packet, and the integrated processing unit performs the destination search and transfers the packet to the external device via one of the distributed processing units.

* * * * *